United States Patent [19]

Meshkat-Razavi

[11] Patent Number: 4,651,068
[45] Date of Patent: Mar. 17, 1987

[54] BRUSHLESS MOTOR CONTROL CIRCUITRY WITH OPTIMUM CURRENT VECTOR CONTROL

[75] Inventor: Saeid Meshkat-Razavi, St. Paul, Minn.

[73] Assignee: Electro-Craft Corporation, Hopkins, Minn.

[21] Appl. No.: 656,459

[22] Filed: Oct. 1, 1984

[51] Int. Cl.$^4$ .............................................. H02P 6/02
[52] U.S. Cl. .................................... 318/254; 318/138; 318/439
[58] Field of Search ............... 318/138, 254, 439, 661, 318/722, 314

[56] References Cited

U.S. PATENT DOCUMENTS

| | | | |
|---|---|---|---|
| 4,223,261 | 9/1980 | White | 318/723 X |
| 4,429,262 | 1/1984 | Utenick | 318/254 |
| 4,447,771 | 5/1984 | Whited | 318/254 X |
| 4,490,661 | 12/1984 | Brown et al. | 318/661 |
| 4,498,037 | 2/1985 | Razavi | 318/561 |

FOREIGN PATENT DOCUMENTS

| | | | |
|---|---|---|---|
| 55-109188 | 8/1980 | Japan | 318/254 |
| 56-71489 | 6/1981 | Japan | 318/254 |
| 57-68697 | 4/1982 | Japan | 318/254 |

Primary Examiner—William M. Shoop, Jr.
Assistant Examiner—Bentsu Ro
Attorney, Agent, or Firm—Faegre & Benson

[57] ABSTRACT

A drive circuit for a brushless motor utilizing both phase shift and current shaping to provide for efficient operation of a brushless motor in a servo control system. The circuit includes circuitry for altering the phase of the drive signal as a function of motor velocity to compensate for increased current phase lag due to inductance of the motor at high commutation frequencies corresponding to high motor velocities. In addition to altering the phase shift of the drive signal, the circuitry also alters the commutation signal waveform to compensate for a non-sinusoidal field distribution to produce a nearly sinusoidal torque from each of the brushless motor windings. The compensation of both phase shift and commutation signal waveform is accomplished using digital circuitry. The phase commutation is a non-linear function of motor velocity. The waveform compensation is selected to compensate for a trapezoidal magnetic field distribution in the motor air gap.

7 Claims, 14 Drawing Figures

BRUSHLESS MOTOR CONTROL CIRCUITRY WITH OPTIMUM CURRENT VECTOR CONTROL

BACKGROUND OF THE INVENTION

1. Field of the Invention

The present invention relates generally to motor control systems. In particular, the invention is an improvement to a closed loop control circuit for a brushless motor.

2. Description of the Prior Art

Various circuits exist in the prior art for the commutation of currents in the motor windings of brushless DC motors. In a typical drive circuit, the windings in the brushless motor are divided into three or more segments. The windings are each driven by semiconductor controls or inverter circuits and the inverter stages are, in turn, driven by a commutation circuit which receives inputs from a commutation encoder connected to the shaft of the motor.

Figure 1:
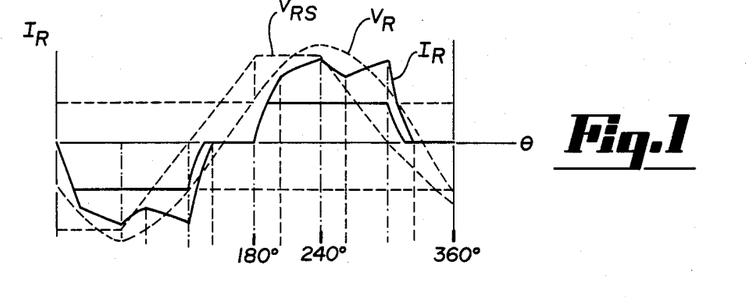
FIG. 1 is a plot showing the current in a single winding of the brushless motor as a function of the shaft angle of the motor.

Because the voltage drive applied to the windings of the brushless motor is only applied during a fraction of a motor rotation as shown in FIG. 1, the resultant drive current on any winding of the motor is quite discontinuous and includes numerous components having higher harmonic frequencies than the frequency corresponding to the period of the motor. Some prior art circuits have modified the voltage drive command signal to approach a drive current. Typically, these arrangements have superimposed a high frequency oscillation on the alternating drive command voltage signal pulse width modulated signal which is, in turn, used to drive the output stage of the inverter to form a sinusoidal drive current having a generally triangular wave higher frequency signal superimposed upon it. That technique, however, does not provide results which are satisfactory at all operating velocities of the motor. Because of the substantial motor inductance, the phase angle between the drive voltage and motor current begins to shift or lag at higher velocity and the generated high speed torques is reduced.

In the prior art system as described in an article by James R. Woodbury entitled "The Design of Brushless DC Motor Systems," published in May 1974 in IEEE Transactions on Industrial Electronics and Control Instrumentation, and as discussed in U.S. Pat. No. 4,447,771 to Whited, the phase of a sinusoidal command voltage is shifted linearly in accordance with the motor velocity to adjust the motor torque angle. Even with such torque angle control, however, the system does not provide uniform results and maximum torques at all speeds because the drive current and hence the motor torque is out of phase. It also provides no compensation for motors having a trapezoidal field distribution.

Because prior conventional compensation circuitry fails to provide adequate compensation of the command signal shape and phase to provide a relatively sinusoidal drive current and a sinusoidal torque distribution at all operating frequencies and torque loads, prior art techniques have not provided optimum current vector control. Further compensation of the drive signal phase and shape is necessary to provide optimal performance of a brushless motor servo system.

SUMMARY OF THE INVENTION

The present invention is an improved motor control system for driving at a constant speed a brushless DC motor including at least two stator windings, a permanent magnet rotor and a position indicator for indicating the angular position of the rotor. The system includes excitation current generating circuit apparatus connected for providing excitation current to the stator windings in response to a current command vector signal. It also includes computing apparatus coupled to the position indicator for receiving information therefrom concerning the position of the rotor. The computing apparatus is constructed and arranged for providing control signals having values selected from a stored table of values in accordance with the calculated rotational speed and instantaneous angular position of the rotor, the values being selected to advance the phase of the control signal in a non-linear manner. Also included is a control circuit responsive to a signal indicative of the difference between the calculated rotational speed and the commanded rotational speed and the control signal provided by the computing means. The control circuit is constructed and arranged for providing a current vector command signal to the excitation current generating means which is advanced in phase to compensate for the variations of phase angle between the excitation current in the stator windings and the magnetic field as a function of motor speed.

DETAILED DESCRIPTION OF THE PREFERRED EMBODIMENTS

FIGS. 1 through 4 show some of the waveforms which may be present in a brushless motor control circuit. For the purposes of this application, there are assumed to be three stator windings for a three phase brushless motor having input terminals generally designated R, S and T and connected at the common ends of each winding in a wye connection. The waveforms relating to one of the three windings in the motor are shown in FIG. 1. The solid line represents the current flow in the winding. Although the waveforms for only the R winding are shown, The S and T winding waveforms have the same shape, but are phase-shifted from it. The bold line represents the motor drive current $I_R$, while the sinusoidal voltage $V_R$ represents the voltage between the R terminal and the neutral terminal for the motor, while $V_{RS}$ represents the voltage between the R and S terminals in a conventional motor drive. The deviations between the armature current and a sine wave represent non-optimum operating characteristics which the present invention attempts to minimize.

Figure 2:
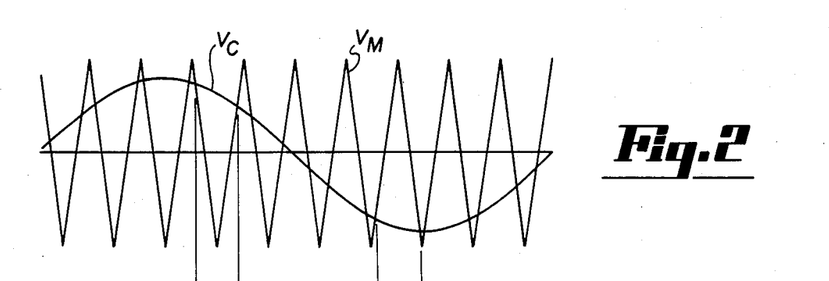
FIGS. 2 through 4 show other waveforms in a motor drive circuit.

In FIG. 2, the sine wave waveform $V_C$ is the command voltage for commanding a sinusoidally varying rate. The rate command voltage is converted in prior art circuits directly to a sequence of voltages used to drive the wye connected brushless motor through a single rotation.

Figure 3:
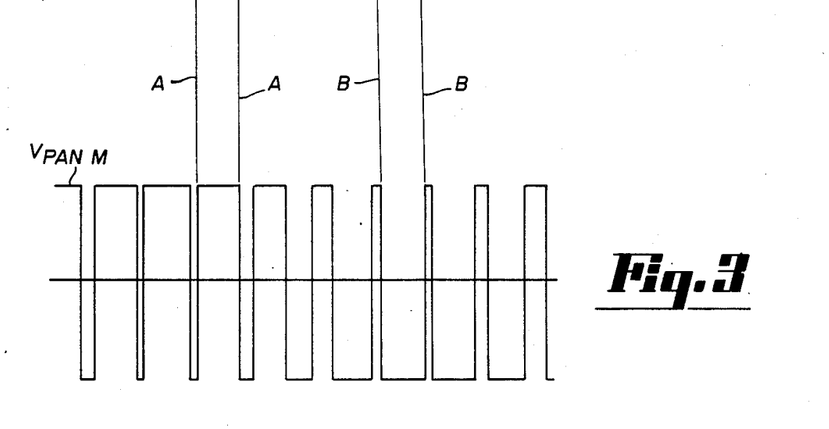

In prior art circuits such as Whited U.S. Pat. No. 4,447,771, the voltage command signal $V_C$ is combined with a substantially higher frequency voltage $V_M$ to achieve a high frequency waveform which is then pulse width modulated and used to drive the current driver stages. In the present circuit, FIG. 2 shows a triangular wave having a period approximately five times that of the command voltage which is used to define the pulse frequency of the drive and smooth the drive current waveform. When the two signals are summed and their sum is applied to the input of a comparator whose output is in turn coupled to a pulse width with modulation circuit, a pulse width modulated drive signal of the type shown in FIG. 3 is produced. The reference lines A—A which connect the waveforms of FIG. 2 to those in FIG. 3 show that the positive pulse width modulated waveform in FIG. 3 is produced when the magnitude of the triangular signal is less than that of the command voltage while the negative excursion of the $V_{PWM}$ waveform in FIG. 3 is produced when the magnitude of the modulated voltage $V_M$ is larger than the command signal $V_C$.

Figure 4:
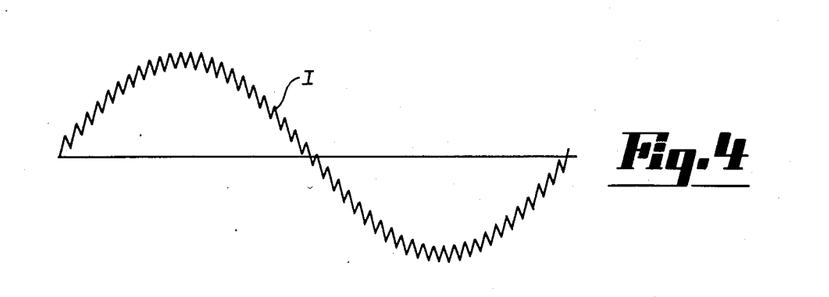

When the modulated square wave shown in FIG. 3 is applied to the input windings of the brushless motor, a drive current approaching the appearance of the one in FIG. 4 is produced in each winding. Commutation circuitry shifts the waveforms 120° relative to each other. The basic sinusoidal current waveform has a much smaller triangular wave superimposed upon it and shows few of the large discontinuities which are objectionable in the current waveform shown in FIG. 1. Although the waveform does have a high frequency harmonic content, the magnitude of those signals is quite small. The relatively high frequency of the triangular wave does not produce an appreciable torque pulsation when the motor is operated at a low velocity.

Use of the above technique alone, however, does not provide ideal results at all of the operating frequencies of the motor. Because the motor has substantial inductance, its admittance at higher frequencies decreases and its high speed torque would be greatly diminished. If the motor were operated as a generator, a phase lag between the current and voltage would be observed.

In order to eliminate such a velocity error, a control circuit utilizing the inventive method herein corrects the phase lag between the motor current and voltage by adjusting the firing angle of the commutation circuitry as a function of the velocity of the motor and also varies the magnitude of the current from a basic sinusoid to a waveform selected to compensate for the non-sinusoidal flux distribution around the motor air gap. Although Whited U.S. Pat. No. 4,447,771 provides a simple linear phase shifted sinusoidal waveform current command, it does not suggest the use of non-linear modification of the phase of the current command to increase the torque output at high speeds. It also does not illustrate the use of amplitude compensation of the current command to adjust for the non-sinusoidal flux distribution in the motor air gap.

Phase Angle and Amplitude Compensation of Drive Current

Figure 5:
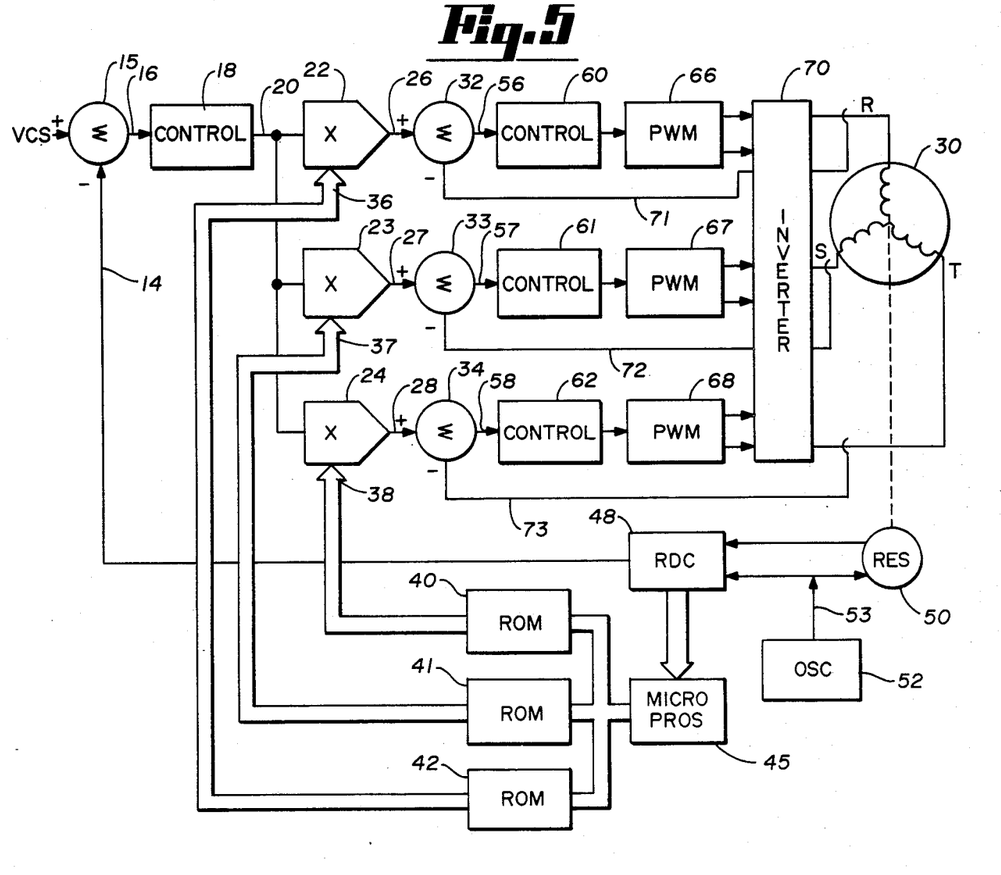
FIG. 5 is a block diagram of a circuit for realizing the present invention.

In the block diagram of FIG. 5, a three phase brushless DC motor and drive circuitry according to the present invention is shown. Three current command signals for the current loops are generated by establishing a set of sinusoidal commutation signals shifted plus or minus 120° relative to each other for a three winding system.

Each of the rate command signals is summed with a rate feedback signal multiplied by a compensation signal which is based upon the motor speed and upon the absolute position of the motor shaft to produce a current vector command which is compensated for phase shift and its amplitude compensated as discussed more fully below. The current vector command is compared with the actual current measured in the windings. A current error signal is then delivered to pulse width modulators which control the currents in the windings.

Because the permanent magnet rotor and the drive currents injected in the stator windings produce fields which are independent of each other when the stator current vector is in phase with the emf, the control of such a brushless motor is straightforward. The equations relating the variables are similar to those characterizing conventional DC motors. They are as follows:

$$\underline{i_s} = \begin{bmatrix} i_R \\ i_S \\ i_T \end{bmatrix} \quad (1)$$

$$\underline{B} = \begin{bmatrix} B_o \sin \theta \\ B_o \sin (\theta + 2\pi/3) \\ B_o \sin (\theta + 4\pi/3) \end{bmatrix} \quad (2)$$

where $i_s$ is the stator current vector and B is the rotor air gap flux density vector. Therefore:

$$T_G = \underline{B}^T \underline{i_s} \, lr \quad (3)$$

when
$T_G$ = the generated torque
r = the rotor radius
l = the length of the rotor
T = the transposition operator In order to keep the torque ripple equal to zero in a sinusoidal operation of a brushless or BLM motor, the winding currents must be synthesized so that:

$$\underline{i_s} = \begin{bmatrix} i_o \sin \theta \\ i_o \sin (\theta + 2\pi/3) \\ i_o \sin (\theta + 4\pi/3) \end{bmatrix} \quad (4)$$

Substituting equations (2) and (3) in (4) results in:

$$T_G = (3/2) i_o B_o rl \quad (5)$$

it is noteworthy that the equations demonstrate that the net torque is independent of shaft position.

If the air gap flux density vector components are not perfectly sinusoidal, variations or ripple in torque will be noted. In such cases, the present invention provides that the microprocessor controlling the current is programmed to synthesize a current command for each winding such that each individual winding generates a torque, independent of shaft position, which is proportional to:

$$\sin^2(\theta + \theta_n)$$

where
$\theta_1 = 0$
$\theta_2 = 2\pi/3$
$\theta_3 = 4\pi/3$

The resultant torque will be equal to that of equation (5). Because the control law for the motor is simple and the control of the motor is independent of the assumed motor resistance and inductance and the motor time constant, the microprocessor computation can optimize both the phase angle of the current vector command to improve high speed torque and the magnitude of the current vector command to provide a sinusoidal torque distribution at all motor velocity conditions.

Figure 11:
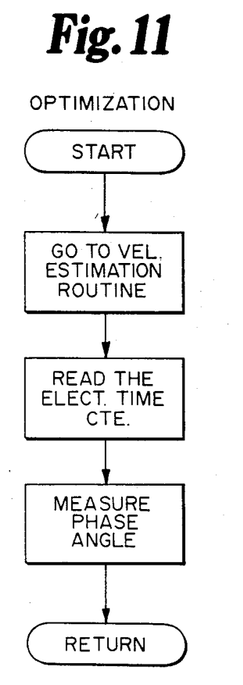
FIG. 11 is a flow chart of the interrupt service flow chart for calculation of the phase advance.

Because the motor electrical time constant $T_E$ is known or can readily be measured for any particular electric motor, the microprocessor in the motor control circuitry can readily calculate, using the flow chart of FIG. 11 for example, the velocity of the motor and then deliver from its memory the phase lag between the voltage and current from the various values stored within the memory which characterize the particular electric motor. An appropriate phase lead correction is then commanded from the commutation circuitry and the phase lag error or mismatch can be totally avoided over a wide range of frequencies.

Figure 10:
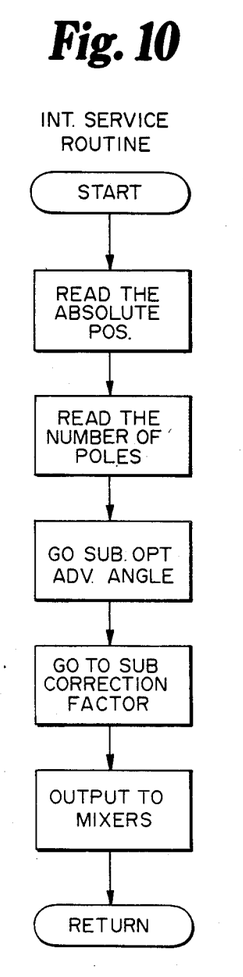
FIG. 10 is a flow chart of the interrupt routine program.

In most physical motors, the motor field distribution is not perfectly sinusoidal. The shape of the motor torque waveform, when sinusoidal drive currents are applied, is dependent upon the magnetic field geometry and other factors. Because this performance factor is always constant for any particular motor, it is also possible to compensate for it as shown in the flow chart of FIG. 10 utilizing the operations of the same microprocessor used to compensate for phase lag. The microprocessor stores data which is used to calculate the adjustment of the phase angle and provides the magnitude correction for all motors having a particular geometry.

In practice, motors are often designed with trapezoidal field distributions. Selecting such a configuration produces a fundamental component having a peak amplitude higher than that of the trapezoid itself. Although the generated torque of such a motor has a higher average value, the trapezoidal waveform also includes third, fifth and seventh harmonics which are significant. For example, the third harmonic is only 20 db smaller than the fundamental.

When the stator windings are driven by sinusoidal currents, the developed torque will exhibit torque ripple with second, fourth and sixth harmonic contents which do not contribute to output torque. In order to minimize these losses, the current vector must be reshaped to achieve a higher average torque with zero torque ripple.

For a trapezoidal flux distribution and considering only the third, fifth and seventh harmonics of the trapezoidal waveform, a correction factor $k(\theta)$ can be defined:

$$K(\theta) \triangleq -h(\theta)s(\theta)$$

where $h(\theta) = \Sigma_n b_n \sin(\theta)$
$s(\theta) = h(\theta) + b_1 \sin(\theta)$ where
$n = 2k+1$ and
$k = 1, 2, 3$ .
and $b_n$ is the magnitude of the nth harmonic The corrected stator current $i_s$ would be:

$$\underline{i_s} = i_s \begin{bmatrix} \sin(\theta)[1 + k(\theta)] \\ \sin(\theta + 2\pi/3)[1 + k(\theta + 2\pi/3)] \\ \sin(\theta + 4\pi/3)[1 + k(\theta + 4\pi/3)] \end{bmatrix}$$

Figure 8:
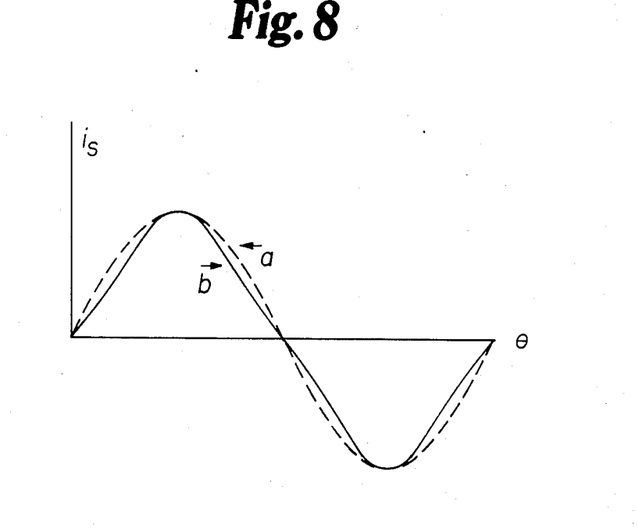
FIG. 8 is a representation of the current waveform corrected for a trapezoidal field distribution.

FIG. 8 shows the pure sine wave stator current in dashed form and the amplitude compensated waveform in solid form which provides a sinusoidal flux distribution where the field distribution is trapezoidal rather than sinusoidal.

Phase Angle Compensation

In circuits such as those in Whited U.S. Pat. No. 4,447,771, the compensation of the phase angle for increasing velocity is basically linear. As can be seen from the graphs in FIG. 7, the linearity of the relationship between the lead angle and the motor velocity is correct only for relatively low velocities and torques. As the torque and velocity increase, it becomes evident that the relationship is an arctangent function, rather than a straight line. The present invention provides compensation of the commutation vector in accordance with an arctangent function by continually calculating the proper phase angle advance to provide a substantially sinusoidal drive current to the stator windings of the motor.

Figure 9:
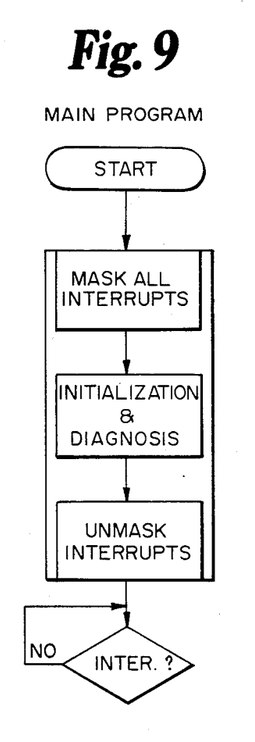
FIG. 9 is a flow chart of the control program for the microcomputer.

FIG. 9 is a flow chart of the main control program for the system. The compensation is accomplished by the interrupt service routine shown in FIG. 10. As shown in the flow chart, that routine comprises the steps of reading the absolute position of the motor shaft, reading the number of motor poles from an operator set switch and then utilizing the optimization subroutine. That program determines the motor velocity. In the next step, the motor's electrical time constant $T_E$ is read from memory where it was previously stored for the particular type of motor being used.

Figure 7:
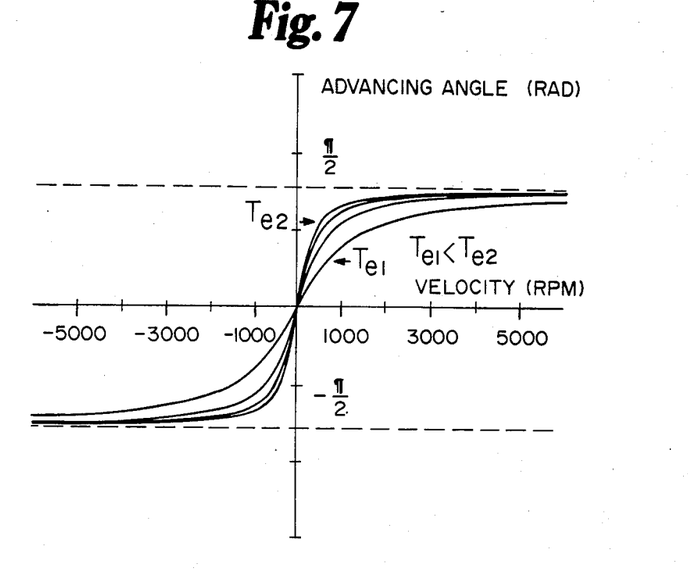
FIG. 7 is a representation of commutation phase lead angle as a function of velocity for varying electrical time constants $T_E$.

The estimated velocity and motor electrical time constant are then utilized to calculate the phase angle correction in accordance with the lead angle versus velocity function relationship shown in FIG. 7 where the phase angle correction $\phi = \tan^{-1}(\omega T_E)$ where $\omega$ is the calculated motor velocity and $T_E$ is the closed loop electrical time constant. The program steps for the optimization subroutine are as set forth on Table 1 below.

TABLE 1

| Program # | OP Code | Operand | Microprocessor Assembly Language | Comments |
|---|---|---|---|---|
| 0000 | 20 | 00 | LI,00 | Initialize |
| 0002 | B0 | B1,B4 | Outs 0,1,4 | Ports and |
| 0005 | 52 | | LR2,A | Reg. 2 |
| 0006 | A0 | | INSO | Input "old" |
| 0007 | 50 | | LRO,A | to Reg. O |
| 0008 | 20 | 00 | LI,00 | Delay |
| 000A | 1F | | INC | Between |
| 000B | 25 | 06 | CI,06 | Read-ins |
| 000D | 94 | FC | BNZ | |
| 000F | A0 | | INSO | Input "new" |
| 0010 | 51 | | LR1,A | to Reg. 1 |
| 0011 | 40 | | LRA,0 | 2's Complement |
| 0012 | 18 | | COM | "old" |

TABLE 1-continued

| Program # | OP Code | Operand | Microprocessor Assembly Language | Comments |
|---|---|---|---|---|
| 0013 | 24 | 01 | AI,01 | |
| 0015 | C1 | | AS,1 | Add 2's comp |
| 0016 | 52 | | LR2,A | "old" & "new" result in reg. 2 |
| 0017 | 22 | 00 | OI,00 | Tests bit |
| 0019 | 81 | 04 | BP | 7.1F = 1, |
| 001B | 18 | | COM | then 2's |
| 001C | 24 | 01 | AI,O | Complement |
| 001E | 53 | | LR3,A | |
| 001F | 07 | | LRQL,A | Result in low byte "Q" reg. |
| 0020 | 20 | 01 | LI,01 | Set high byte of |
| 0022 | 06 | | LRQU,A | "Q" register = 01 |
| 0023 | 0F | | LRDC,Q | Load data control w/offset address |
| 0024 | A1 | | INSI | Tests direction bit 0 |
| 0025 | 25 | FE | CI,FE | if 0, then branch |
| 0027 | 84 | 06 | BZ | to 002E |
| 0029 | 16 | | LM(A DC) | Load accumulator w/offset value |
| 002A | C1 | | As,1 | Add accumulator w/"new" in Reg. 1 |
| 002B | B4 | | Outs 4 | Output on port 4 |
| 002C | 90 | D9 | BR | Branch to start |
| 002E | 16 | | LM(A DC) | Reverse direction load offset to acc. |
| 002F | 18 | | COM | 2's complement |
| 0030 | 24 | 01 | AI,01 | |
| 0032 | C1 | | AS,1 | Add accumulator to Reg |
| 0033 | B4 | | Outs 4 | Output on port 4 |
| 0034 | 90 | D1 | BR | Branch to start |

The optimized advance angle is added to the normal commutation sinusoidal angle. After it is calculated, the flow chart of FIG. 10 performs the calculation for the shape correction of the current waveform, and the phase and amplitude corrected signal is applied as the multiplicand to multipliers 22, 23 and 24.

Block Diagram

In FIG. 5, a voltage command signal is generated by control circuitry not specifically shown, but well known in the art. That voltage is summed with an analog tachometer feedback signal 14, the generation of which is discussed below. The analog tachometer feedback signal has a magnitude proportional to the rotational angular velocity of the shaft of the motor.

The difference signal 16 which appears at the output of summing point 15 is modified by conventional control circuitry 18 which may operate to modify the gain and frequency response of the control circuitry in accordance with known principles. For example, my copending application, Ser. No. 534,801, filed Sept. 22, 1983, now U.S. Pat. No. 4,498,037 entitled "Velocity Servo Controller" shows such circuitry.

The output signal 20 of control circuitry 18 is applied to multiplier input terminals of three multiplier circuits 22, 23 and 24, one of which is utilized for each of the windings of a three-phase brushless motor 30. Multipliers 22, 23 and 24 have respective outputs 26, 27 and 28, which are in turn connected to summing points 32, 33 and 34.

The multiplicand inputs 36, 37 and 38 of multipliers 22, 23 and 24 are read from read only memories or ROMs 40, 41 and 42 shown in block form in FIG. 5. As shown in the block diagram, read only memories 40, 41 and 42 are generally driven by microprocessor 45 which receives its primary input signal from a resolver to digital converter 48. Input signals to resolver to digital converter 48 are provided by a resolver 50 which is excited by an oscillator 52 having an output signal 53. Resolver 50 has its shaft directly coupled to the output shaft of motor 30 to track the absolute angular position of that shaft.

Outputs 56, 57 and 58 of summing circuits 32, 33 and 34 are connected to further control circuits 60, 61 and 62 which are in turn connected to conventional pulse width modulators 66, 67 and 68. The outputs of those pulse width modulators are in turn connected to conventional inverter circuits 70 which are connected to drive the three windings of wye connected brushless motor 30. Current feedback signals 71, 72 and 73 are connected from the inverter 70 to summing circuits 32, 33 and 34.

Detailed Circuit Schematic

Figure 6:
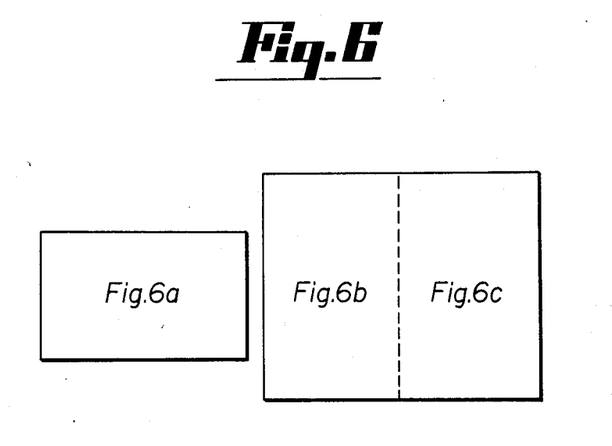
FIG. 6 is a layout of FIGS. 6A, 6B and 6C which are detailed schematic diagrams of a preferred embodiment of a circuit for realizing the present invention.
Figure 6A:
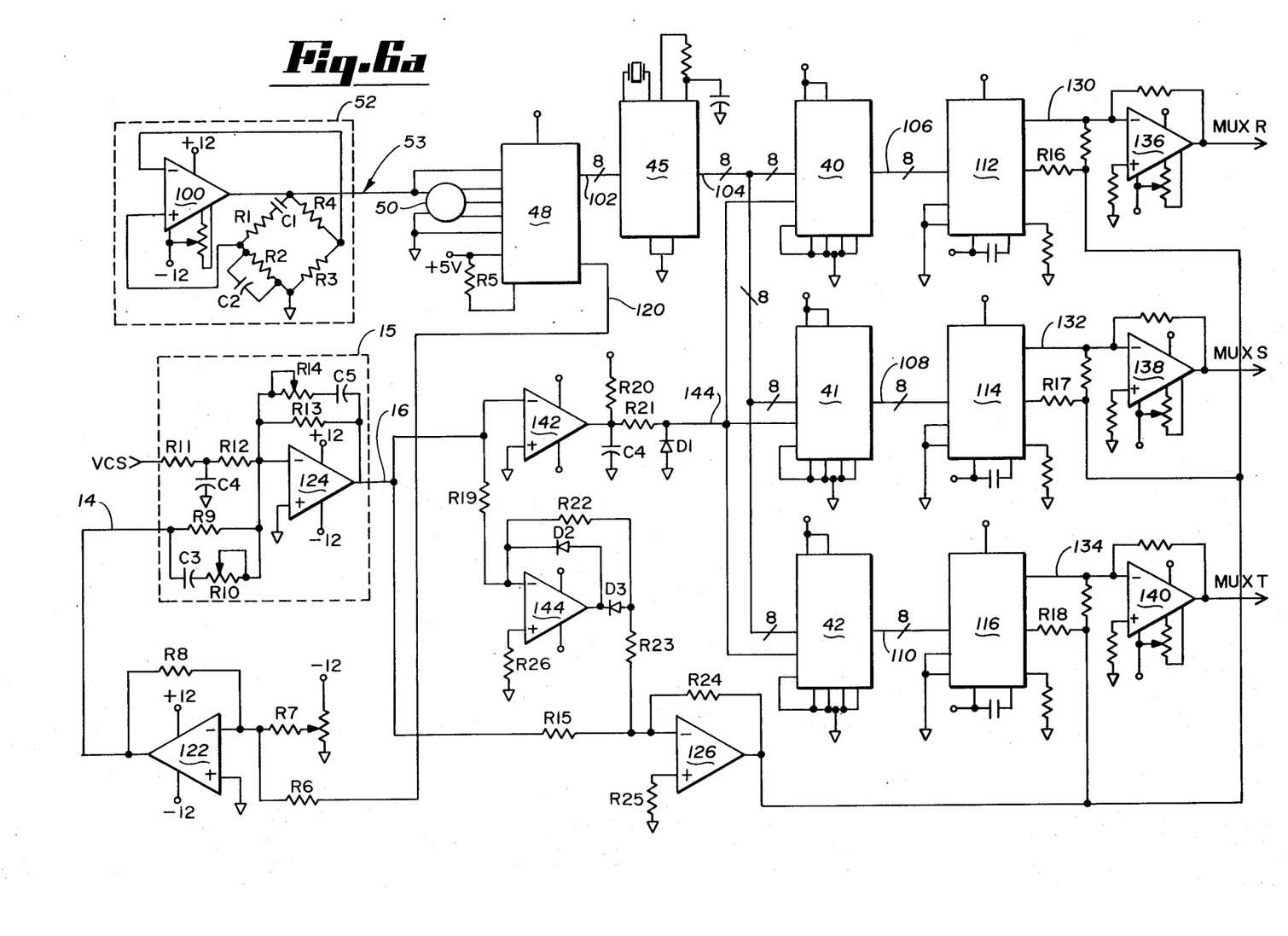
Figure 6B:
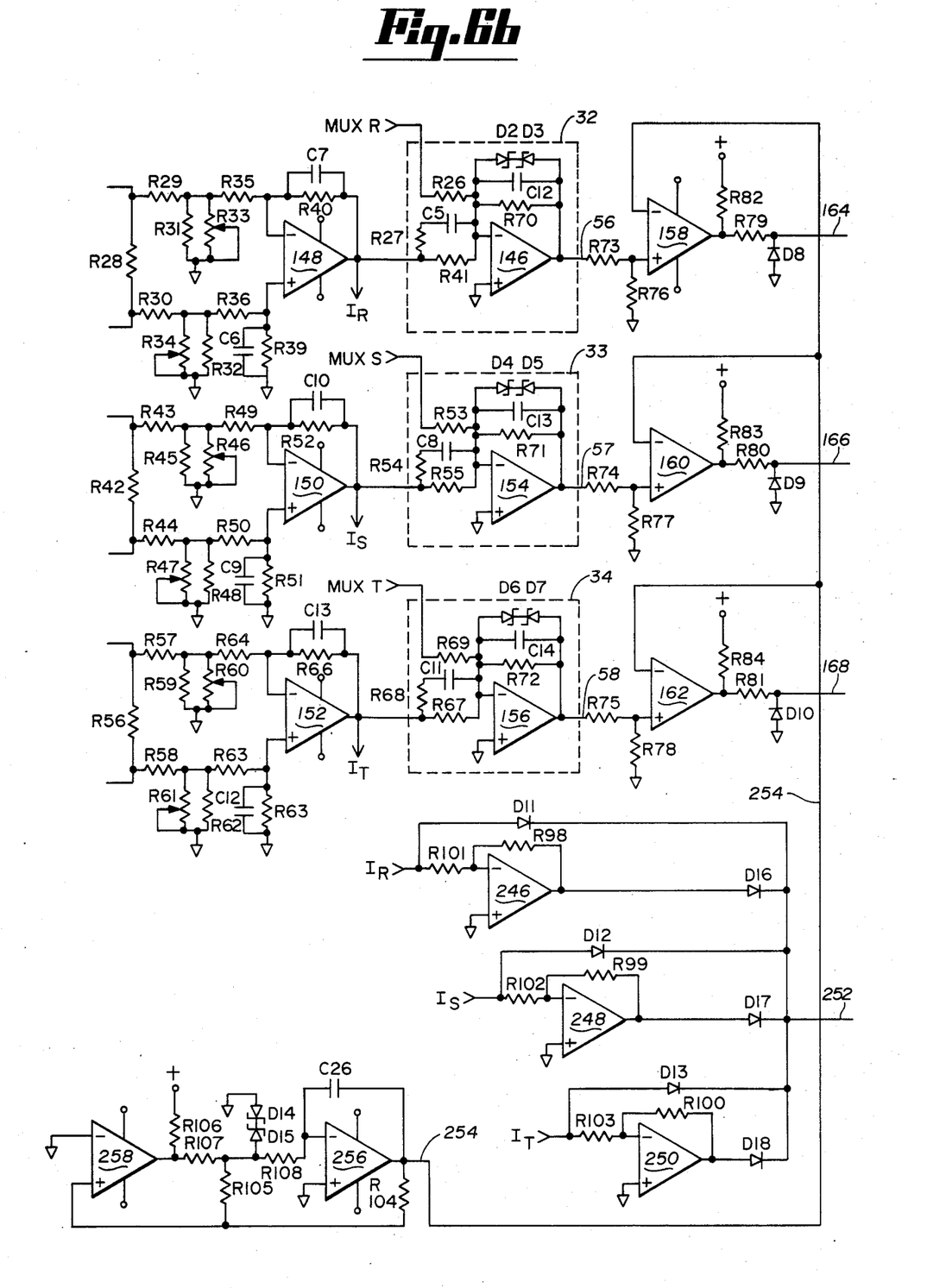
Figure 6C:
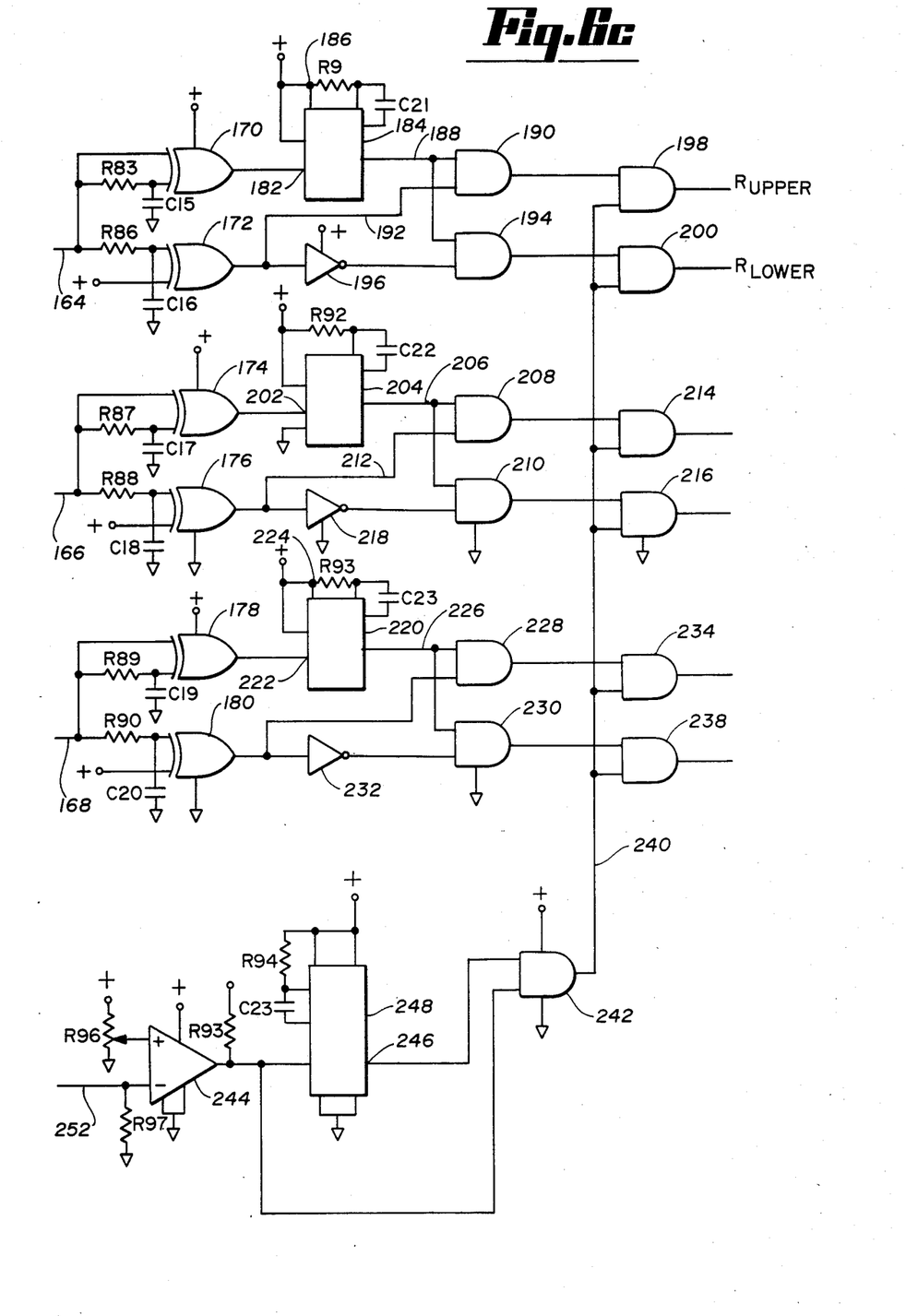

A preferred embodiment of the control circuitry of the present invention is shown in FIGS. 6A, 6B and 6C which are organized as shown in FIG. 6. Referring first to FIG. 6A, the resolver 50, which is connected to the output shaft of motor 30, is shown in the upper left hand portion of FIG. 6A. The resolver is excited by oscillator 52 which contains a number of component elements within the block designated 52. Those components are connected in the form of a Wein oscillator which produces a sinusoidal output signal 53 used to excite the resolver.

The oscillator comprises an operational amplifier 100 which is a conventional 3140 operational amplifier available from a number of manufacturers. The output of amplifier 100 drives the Wein bridge comprised of resistors R1, R2, R3 and R4 and capacitors C1 and C2. The outputs of the Wein bridge are connected to the inverting and noninverting outputs of amplifier 100 as shown in FIG. 6A.

The three outputs of synchro 50 are connected to appropriate inputs of the synchro to digital converter 48 which provides an eight bit digital output signal 102 delivered to the input of a 38P70 microprocessor chip 45. Block 45 also includes a basic microcomputer and an EPROM, so it is capable of functioning as a self-contained microcomputer. Output 104 of microcomputer 45 is connected to the inputs of ROM memory chips 40, 41 and 42 which are commonly available 2716 chips manufactured by a number of manufacturers. Each of the ROM memories receives an eight bit signal from the EPROM memory of the computer chip 45.

The digital word carried by bus 104 represents the rotational rate of the motor shaft and is used to address the appropriate memory locations in chips 40, 41 and 42 to select the appropriate phase compensated values in view of the motor rotational speed. The compensation values for a particular motor are stored in the various memory locations in the memory chips 22, 23 and 24. The outputs 106, 108 and 110 of the three memory chips 40, 41 and 42, respectively, are connected to inputs of digital to analog converter chips 112, 114 and 116 which are a part of multiplier circuits 22 shown in block diagram form in FIG. 5. The other input to the digital to analog converter chips 112, 114 and 116 is derived from the difference signal 16 formed by summing the voltage control signal $V_{CS}$ with the tachometer feedback signal 14.

The tachometer feedback signal 14 is generated by an analog output 120 of the resolver to digital conversion chip 48. That signal is then connected to an inverting input of an amplifier 122 which is half of a 3240 operational amplifier. The offset can be adjusted by adjusting the potentiometer connected to one end of resistor or potentiometer R7. The signal from the offset adjustment resistor R7 is summed with the signal passing through resistor R6 which is connected through conductor 120 to resolver to digital converter chip 48. The output signal of amplifier 122 is the $V_{TACH}$ signal which is connected through conductor 14 to the input of the summing junction 15 which includes the components enclosed within the dashed line and marked 15.

The $V_{TACH}$ signal is compensated by the filter formed of resistor R9, variable resistor R10 and capacitor C3. The $V_{CS}$ signal is compensated by the first order lag circuit comprised of resistor R11 and capacitor C4 and then through input resistor R12 to amplifier 124. Amplifier 124 has a feedback resistor R13 and an RC compensation feedback path formed of resistor R14 and capacitor C5. The output on conductor 16 is connected through resistor R15 to an inverting input of amplifier 126, the output of which is connected through resistors R16, R17 and R18 to the reference inputs of digital to analog converters 112, 114 and 116, respectively. The conductor 16 output is also connected through resistors $R_{16}$, $R_{17}$ and $R_{18}$ to the inputs of amplifiers 136, 138 and 140, respectively. The outputs of digital to analog converters 112, 114 and 116 at conductors 130, 132 and 134 represent the product of the digital and the analog inputs which is then summed with the output of amplifier 126 and amplified by converting amplifiers 136, 138 and 140 to produce output signals "MUX R, MUX S and MUX T" which are delivered to inputs bearing the same labels on the circuitry in FIG. 6B.

In addition to being connected through resistor R15 to the input of amplifier 126, the difference signal appearing on conductor 16 is connected to the negative input of an LM339 comparator 142 and through resistor R19 to the inverting input of amplifier 144. The output of comparator 142 is connected to a filter and compensation circuit comprised of resistors R20 and R21, capacitor C4 and diode D1 to the least significant bit inputs of ROM chips 40, 41 and 42. The signal which appears at conductor 144 indicates whether the error signal at 16 is positive or negative to select the data stored in ROM from the proper portion of memory.

Amplifier 144 has its noninverting input grounded through resistor R26. It has a feedback network comprised of diodes D2, D3 and resistor R22. Its output passes through resistor R23 and is summed with a signal which has passed through resistor R15 from conductor 16. The composite signal is applied to the inverting input of amplifier 126 which has a feedback resistor R24 and a bias resistor R25 between its noninverting input and ground.

Turning now to FIG. 6B, the summing junctions 32, 33 and 34 of the FIG. 5 block diagram are shown in detail in blocks bearing those reference numbers. The MUX R signal from FIG. 6A is connected to the inverting input of amplifier 146 through resistor R26. The other input signal to amplifier 146 is connected through resistor R27 and capacitor C5 which are connected in parallel with resistor R41.

The signal input is derived from the current in winding R of the motor which passes through current measuring resistor R28. The current through R28 produces a voltage drop across it proportional to the current flow. That voltage signal is conducted through resistors R29 and R30 and balancing networks comprised of resistors R31 and R32, together with variable resistors and potentiometers R33 and R34. The voltage signals are then conducted through resistors R35 and R36 to the inverting and noninverting inputs of amplifier 148, a conventional 3290 amplifier which has a compensation circuit comprised of resistor R39 and capacitor C6 connected between the noninverting input and ground. A feedback network for amplifier 148 is comprised of resistor R40 and capacitor C7. Identical circuits are used to provide the current signals to summing blocks 33 and 34.

Amplifier 146 has a feedback network comprised of a resistor R70, a capacitor C12 and back to back zener diodes D2 and D3. Identical networks are applicable to amplifiers 154 and 156.

The outputs of summing junctions 32, 33 and 34 at conductors 56, 57 and 58 are connected respectively through resistors R73, R74 and R75 to the noninverting inputs of amplifiers 158, 160 and 162. Resistors R76, R77 and R78 are connected between the noninverting inputs and ground. The outputs of amplifiers 158, 160 and 162 are connected through resistors R79, R80 and R81 to conductors 164, 166 and 168. Bias resistors R82, R83 and R84 are connected to the positive supply at the output terminals of amplifiers 158, 160 and 162, while diodes D8, D9 and D10 are connected between ground and the other end of resistors R79, R80 and R81.

For the R winding, the signal on conductor 164 is connected to one input of exclusive OR 170. Exclusive OR circuit 170 is one gate of a 4070 chip, manufactured by Fairchild Semiconductor and other manufacturers. The other input of exclusive OR circuit 170 has a first order lag circuit comprised of resistor R83 and capacitor C15. A similar lag circuit is connected between conductor 164 and the input of exclusive OR circuit 172. That lag circuit is comprised of resistor R86 and capacitor C16. The other input to exclusive OR 172 is connected to the positive supply. Similar exclusive OR circuits are also used for the S and T winding using exclusive OR circuits 174, 176, 178 and 180.

The output of exclusive OR 170 is connected to a positive triggering input 182 of a dual retriggerable, resettable monostable multivibrator manufactured by Fairchild Semiconductors and others under the designation 4528. Capacitor C21 is connected across the external capacitor inputs to the chip, while resistor R91 is connected between the power input 186 and the external capacitor input terminal for the multivibrator. The negative triggering input terminal is also connected to the positive power supply.

The complementary output of the monostable multivibrator 184 is connected to conductor 188 and to one input terminal of a two-input AND gate 190 which receives its other input on conductor 192 directly from the output of exclusive OR gate 172. A further AND gate 194 receives one input from conductor 188 and the other from the output of exclusive OR gate 172 through an inverter 196.

The output of AND gate 190 provides one input to AND gate 198, while the output of AND gate 194 provides an input to AND gate 200. The output of AND gate 198 provides the drive command for the power transistor connected to the upper end of the R winding, while the output of AND gate 200 provides the drive for the drive transistor connected to the lower end of winding R. Entirely analogous circuits provide the S and T upper and lower command voltages. In all cases, the other signal applied to the final AND gates 198, 200, 214, 216, 234 and 238 is from conductor 240. Conductor 240 which is the output of a two-input AND gate 242 which has one input connected to the output of an LM311 comparator 244 and its other input terminal connected to the complementary output 246 of a one-shot monostable multivibrator type 4528.

The negative trigger input to one-shot 248 is connected to the output of amplifier 244. The output of amplifier 244 is connected to the positive supply through resistor R95. It has a positive reference point connected to a potentiometer R96 and its inverting input connected through resistor R97 to ground. The inverting input to comparator 244 is derived from the outputs of amplifiers 246, 248 and 250 which have their outputs connected through diodes D16, D17 and D18 to conductor 252. Each of those amplifiers has a feedback resistor R98, R99 or R100 and an input resistor R101, R102 or R103. In addition to voltages from the outputs of amplifiers 246, 248 and 250, the conductor 252 receives through diodes D11, D12 and D13 the correct $I_R$, $I_S$ and $I_T$ outputs of amplifiers 148, 150 and 152.

Finally, in the lower left hand corner of FIG. 6B, there is shown the circuit for creating the oscillator signal which is to be summed with the outputs of the summing junctions 32, 33 and 34 by amplifiers 158, 160 and 162. Conductor 254 carries the output signal. The output is a 12.5 khz oscillation produced by an amplifier 256 having a feedback capacitor C26 and a feedback path through resistors R104 and R105. It also includes a further amplifier 258. Amplifiers 256 and 258 are both conventional type 3405 chips. They are interconnected utilizing a resistor R106 connected to the positive supply series resistor R107, a pair of back to back zenor diodes D14 and D15 and a further series resistor R108.

I claim:

1. A motor control system for driving at a constant speed a multiple phase brushless DC motor, including at least two stator windings, a permanent magnet rotor and a position indicator for indicating the angular position of the rotor, the system comprising:
   (a) excitation current generating circuit means connected for providing excitation current to the stator windings in response to a current command vector signal;
   (b) computing means coupled to the position indicator for receiving information therefrom concerning the position of the rotor and for providing a control signal for each axis having values selected from a stored table of values in accordance with the calculated rotational speed and the instantaneous angular position of the rotor, the values being selected to correct the amplitude of the current vector command to compensate for non-sinusoidal variation of the magnetic field in the air gap as a function of the angular position of the rotor; and
   (c) control circuit means responsive to a velocity error signal indicative of the difference between the calculated rotational speed and the commanded rotational speed and the control signal provided by the computing means and for providing a current vector command signal to the excitation current generating means which is adjusted in magnitude to provide a substantially sinusoidal tongue distribution for each phase.

2. A motor control system for driving at a constant speed a multiple phase brushless DC motor, including at least two stator windings, a permanent magnet rotor and a position indicator for indicating the angular position of the rotor, the system comprising:
   (a) excitation current generating circuit means connected for providing excitation current to the stator windings in response to a current command vector signal;
   (b) computing means coupled to the position indicator for receiving information therefrom concerning the position of the rotor and for providing a control signal for each axis having values selected from a stored table of values in accordance with the calculated rotational speed and the instantaneous angular position of the rotor, the values being selected to advance the phase of control signal in a non-linear manner, according to the formula $\phi = \tan^{-1}(\omega T_E)$, where $T_E$ is the time constant of the closed loop current and $\omega$ is the electrical angular velocity; and
   (c) control circuit means responsive to a velocity error signal indicative of the difference between the calculated rotational speed and the commanded rotational speed and also responsive to the control signal provided by the computing means and for providing a current vector command signal to the excitation current generating means which is advanced in phase to compensate for variations of phase angle between the excitation current in the stator windings and the magnetic field as a function of motor speed.

3. A motor control system for driving at a constant speed a multiple phase brushless DC motor, including at least two stator windings, a permanent magnet rotor and a position indicator for indicating the angular position of the rotor, wherein the DC motor has a trapezoidal fluid distribution and wherein the stator excitation current for a particular phase is multiplied by the factor and $K(\theta)$ is defined by $-h(\theta)/s\theta$ where $$k(\theta) = \Sigma_n b_n \sin(\theta)$$

$$s(\theta) = h(\theta) + b_1 \sin(\theta)$$

where $n = 2k + 1$ and $k = 1, 2, 3$ and $b_n$ is the magnitude of the nth harmonic, the system comprising:
   (a) excitation current generating circuit means connected for providing excitation current to the stator windings in response to a current command vector signal;
   (b) computing means coupled to the position indicator for receiving information therefrom concerning the position of the rotor and for providing a control signal for each axis having values selected from a stored table of values in accordance with the calculated rotational speed and the instantaneous angular position of the rotor, the values being selected to advance the phase of control signal in a non-linear manner; and
   (c) control circuit means responsive to a velocity error signal indicative of the difference between the calculated rotational speed and to the commanded rotational speed and the control signal provided by the computing means and for providing a current vector command signal to the excitation current generating means which is advanced in phase to compensate for variations of phase angle between the excitation current in the stator windings and the magnetic field as a function of motor speed.

4. A motor control system for driving at a constant speed a multiple phase brushless DC motor, including at least two stator windings, a permanent magnet rotor and a position indicator for indicating the angular position of the rotor, the system comprising:
(a) excitation current generating circuit means connected for providing excitation current to the stator windings in response to a current command vector signal;
(b) computing means coupled to the position indicator for receiving information therefrom concerning the position of the rotor and for providing a control signal for each axis having values selected from a stored table of values in accordance with the calculated rotational speed and the instantaneous angular position of the rotor, the values being selected to advance the phase of control signal in a non-linear manner and to correct the amplitude of the current vector command to compensate for non-sinusoidal variation of the magnetic field in the air gap as a function of the angular position of the rotor; and
(c) control circuit means responsive to a velocity error signal indicative of the difference between the calculated rotational speed and the commanded rotational speed and the control signal provided by the computing means and for providing a current vector command signal to the excitation current generating means which is advanced in phase to compensate for variations of phase angle between the excitation current in the stator windings and the magnetic field as a function of motor speed and is adjusted in magnitude to provide a substantially sinusoidal torque distribution for each phase.

5. The invention of claim 4 wherein the control circuit means multiplies the control signal from the computing means by the velocity error signal to provide the current command vector signal to the excitation current generating circuit means.

6. In combination with a brushless motor, an inverter drive circuit comprising:
(a) command generating circuit means for generating a sinusoidal command voltage having a frequency proportional to the desired rotational velocity of the brushless motor over an operating range of velocities;
(b) signal generating circuitry for producing a substantially triangular voltage signal having a frequency substantially higher than the anticipated frequency of the sinusoidal command voltage at the upper end of the operating range of velocities;
(c) pulse width modulating means coupled to receive the command voltage from the command generating circuit means and the alternating voltage signal generated by the further generating circuitry and for producing a modified command voltage having first and second levels, the modified command voltage having the first level when the command voltage and the alternating voltage are both positive and having the second level when the command voltage and the alternating voltage signals are both negative;
(d) commutor means coupled to the output of the pulse width modulating means to receive the modified command voltage therefrom and for driving the brushless motor with a motor drive current having a sinusoidal fundamental component at a frequency corresponding to the frequency of the command voltage and a superimposed alternating signal having a frequency corresponding to the frequency of the alternating voltage signal and a magnitude substantially less than the magnitude of the fundamental component for driving the brushless motor smoothly;
(e) shaft position sensing means for generating a signal indicative of the angular position of the shaft of the brushless motor;
(f) first control means operatively coupled to the shaft position sensing means for receiving the output from the shaft position sensing means and for delivering a phase modified output signal and for calculting a corrective lead angle for the sinusoidal command voltage which is non-linearly dependent upon the rotational velocity of the motor shaft and the electrical characteristics of the motor; and
(g) signal processing means for receiving the output signal from the first control means and the voltage command signal and for generating a phase corrected output voltage having a correction factor selected to produce a motor drive current having minimal discontinuities over a wide range of operating velocities.

7. The method of optimizing the excitation of a brushless DC motor comprising the steps of:
(a) sensing the absolute position of the motor shaft angle and estimating the shaft angle velocity during a particular time increment;
(b) using the estimated velocity and the motor's electrical time constant, looking in a storage table for an optimum advancing angle;
(c) determining the optimum advancing angle by the relationship $\phi = \tan^{-1}(\omega T_E)$, where $\phi$ is the optimum advancing angle, $\omega$ is the estimated motor velocity and $T_E$ is the motor electrical time constant;
(d) adding the optimized advancing angle to the commutation sinusoidal angle; and
(e) providing the final angle to the commutation memory for driving the motor utilizing a pulse width modulator inverter.

* * * * *